(12) United States Patent
Kumar et al.

(10) Patent No.: US 8,990,573 B2
(45) Date of Patent: Mar. 24, 2015

(54) SYSTEM AND METHOD FOR USING VARIABLE SECURITY TAG LOCATION IN NETWORK COMMUNICATIONS

(75) Inventors: Srinivas Kumar, Cupertino, CA (US); Vijayashree S. Bettadapura, Campbell, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1162 days.

(21) Appl. No.: 12/267,850

(22) Filed: Nov. 10, 2008

(65) Prior Publication Data

US 2009/0144818 A1 Jun. 4, 2009

Related U.S. Application Data

(60) Provisional application No. 60/986,833, filed on Nov. 9, 2007.

(51) Int. Cl.
*H04L 9/32* (2006.01)
*H04L 29/06* (2006.01)

(52) U.S. Cl.
CPC ...... *H04L 63/0272* (2013.01); *H04L 29/06102* (2013.01); *H04L 29/0653* (2013.01); *H04L 63/105* (2013.01); *H04L 63/166* (2013.01); *H04L 63/20* (2013.01)
USPC .......................................... 713/175; 713/168

(58) Field of Classification Search
CPC ..................... H04L 29/06102; H04L 29/0653; H04L 63/08; H04L 63/20; H04L 69/161; H04L 69/221; H04L 49/3009
See application file for complete search history.

(56) References Cited

U.S. PATENT DOCUMENTS

| 5,218,637 | A | 6/1993 | Angebaud et al. |
| 5,757,916 | A | 5/1998 | MacDoran et al. |
| 5,784,562 | A | 7/1998 | Diener |

(Continued)

FOREIGN PATENT DOCUMENTS

| CA | 2286534 | 4/2001 |
| EP | 1 071 256 | 1/2001 |

(Continued)

OTHER PUBLICATIONS

Aleksander Svelokken, "Biometric Authentication and Identification Using Keystroke Dynamics With Alert Levels", Master Thesis (Retrieved from University of Oslo), May 23, 2007, pp. 1-124.

(Continued)

*Primary Examiner* — Krista Zele
*Assistant Examiner* — Matthew Lindsey
(74) *Attorney, Agent, or Firm* — Foley & Lardner LLP; Christopher J. McKenna; Paul M. H. Pua

(57) ABSTRACT

A method of packet security management to ensure a secure connection from one network node to another. The method includes creating a security tag for each packet in a network session, selecting one of a number of possible tag locations within the packet, inserting the security tag at that location, transmitting the tagged packets from a sending node to the receiving node, authenticating the packets' security tags at the receiving node, and dropping non-authenticated packets. The method also includes determining best possible tag locations when sending a packet and locating a security tag when receiving a packet.

21 Claims, 9 Drawing Sheets

(56) References Cited

U.S. PATENT DOCUMENTS

| | | | |
|---|---|---|---|
| 5,867,494 A | 2/1999 | Krishnaswamy et al. | |
| 5,887,065 A | 3/1999 | Audebert | |
| 5,983,270 A | 11/1999 | Abraham et al. | |
| 5,987,611 A | 11/1999 | Freund | |
| 5,999,525 A | 12/1999 | Krishnaswamy et al. | |
| 6,021,495 A | 2/2000 | Jain et al. | |
| 6,070,245 A | 5/2000 | Murphy et al. | |
| 6,076,108 A | 6/2000 | Courts et al. | |
| 6,105,136 A | 8/2000 | Cromer et al. | |
| 6,141,758 A | 10/2000 | Benantar et al. | |
| 6,145,083 A | 11/2000 | Shaffer et al. | |
| 6,161,182 A | 12/2000 | Nadooshan | |
| 6,170,019 B1 | 1/2001 | Dresel et al. | |
| 6,199,113 B1 | 3/2001 | Alegre et al. | |
| 6,219,669 B1 | 4/2001 | Haff et al. | |
| 6,253,326 B1 | 6/2001 | Lincke et al. | |
| 6,304,969 B1 | 10/2001 | Wasserman et al. | |
| 6,335,927 B1 | 1/2002 | Elliott et al. | |
| 6,345,291 B2 | 2/2002 | Murphy et al. | |
| 6,393,569 B1 | 5/2002 | Orenshteyn | |
| 6,418,472 B1 | 7/2002 | Mi et al. | |
| 6,442,571 B1 | 8/2002 | Haff et al. | |
| 6,452,915 B1 | 9/2002 | Jorgensen | |
| 6,470,453 B1 | 10/2002 | Vilhuber | |
| 6,473,794 B1 | 10/2002 | Guheen et al. | |
| 6,480,967 B1 | 11/2002 | Jensen et al. | |
| 6,502,192 B1 | 12/2002 | Nguyen | |
| 6,510,350 B1 | 1/2003 | Steen et al. | |
| 6,519,571 B1 | 2/2003 | Guheen et al. | |
| 6,523,027 B1 | 2/2003 | Underwood | |
| 6,535,917 B1 | 3/2003 | Zamanzadeh et al. | |
| 6,536,037 B1 | 3/2003 | Guheen et al. | |
| 6,594,589 B1 | 7/2003 | Coss, Jr. et al. | |
| 6,601,233 B1 | 7/2003 | Underwood | |
| 6,609,128 B1 | 8/2003 | Underwood | |
| 6,615,166 B1 | 9/2003 | Guheen et al. | |
| 6,633,878 B1 | 10/2003 | Underwood | |
| 6,640,248 B1 | 10/2003 | Jorgensen | |
| 6,704,873 B1 | 3/2004 | Underwood | |
| 6,718,535 B1 | 4/2004 | Underwood | |
| 6,721,713 B1 | 4/2004 | Guheen et al. | |
| 6,725,269 B1 | 4/2004 | Megiddo | |
| 6,731,625 B1 | 5/2004 | Eastep et al. | |
| 6,735,691 B1 | 5/2004 | Capps et al. | |
| 6,748,287 B1 | 6/2004 | Hagen et al. | |
| 6,754,181 B1 | 6/2004 | Elliott et al. | |
| 6,766,314 B2 | 7/2004 | Burnett | |
| 6,785,692 B2 | 8/2004 | Wolters et al. | |
| 6,826,616 B2 | 11/2004 | Larson et al. | |
| 6,839,759 B2 | 1/2005 | Larson et al. | |
| 6,850,252 B1 | 2/2005 | Hoffberg | |
| 6,856,330 B1 | 2/2005 | Chew et al. | |
| 6,870,921 B1 | 3/2005 | Elsey et al. | |
| 6,909,708 B1 | 6/2005 | Krishnaswamy et al. | |
| 6,944,279 B2 | 9/2005 | Elsey et al. | |
| 6,947,992 B1 | 9/2005 | Shachor | |
| 6,954,736 B2 | 10/2005 | Menninger et al. | |
| 6,957,186 B1 | 10/2005 | Guheen et al. | |
| 6,985,922 B1 | 1/2006 | Bashen et al. | |
| 7,013,290 B2 | 3/2006 | Ananian | |
| 7,039,606 B2 | 5/2006 | Hoffman et al. | |
| 7,054,837 B2 | 5/2006 | Hoffman et al. | |
| 7,072,843 B2 | 7/2006 | Menninger et al. | |
| 7,096,495 B1 | 8/2006 | Warrier et al. | |
| 7,100,195 B1 | 8/2006 | Underwood | |
| 7,107,285 B2 | 9/2006 | Von Kaenel et al. | |
| 7,120,596 B2 | 10/2006 | Hoffman et al. | |
| 7,145,898 B1 | 12/2006 | Elliott | |
| 7,149,698 B2 | 12/2006 | Guheen et al. | |
| 7,149,803 B2 | 12/2006 | Douglis et al. | |
| 7,160,599 B2 | 1/2007 | Hartman | |
| 7,165,041 B1 | 1/2007 | Guheen et al. | |
| 7,171,379 B2 | 1/2007 | Menninger et al. | |
| 7,188,138 B1 | 3/2007 | Schneider | |
| 7,188,180 B2 | 3/2007 | Larson et al. | |
| 7,194,552 B1 | 3/2007 | Schneider | |
| 7,331,061 B1 | 2/2008 | Ramsey et al. | |
| 7,334,125 B1 | 2/2008 | Pellacuru | |
| 7,353,533 B2 | 4/2008 | Wright et al. | |
| 7,363,347 B2 | 4/2008 | Thomas | |
| 7,386,889 B2 | 6/2008 | Shay | |
| 7,398,552 B2 | 7/2008 | Pardee et al. | |
| 7,430,760 B2 | 9/2008 | Townsend et al. | |
| 7,509,687 B2* | 3/2009 | Ofek et al. | 726/30 |
| 7,519,986 B2* | 4/2009 | Singhal | 726/2 |
| 7,567,510 B2* | 7/2009 | Gai et al. | 370/230 |
| 7,593,529 B1* | 9/2009 | Yang | 380/200 |
| 7,596,803 B1 | 9/2009 | Barto et al. | |
| 7,637,147 B2 | 12/2009 | Lee et al. | |
| 7,644,434 B2 | 1/2010 | Pollutro et al. | |
| 7,660,902 B2 | 2/2010 | Graham et al. | |
| 7,660,980 B2* | 2/2010 | Shay et al. | 713/154 |
| 7,770,223 B2 | 8/2010 | Shevenell et al. | |
| 7,877,601 B2* | 1/2011 | Smith et al. | 713/160 |
| 7,978,700 B2* | 7/2011 | Kopelman et al. | 370/392 |
| 8,412,838 B1 | 4/2013 | Wang et al. | |
| 2001/0020195 A1 | 9/2001 | Patel et al. | |
| 2001/0052012 A1 | 12/2001 | Rinne et al. | |
| 2001/0054044 A1 | 12/2001 | Liu et al. | |
| 2001/0054147 A1 | 12/2001 | Richards | |
| 2002/0002577 A1 | 1/2002 | Garg et al. | |
| 2002/0022969 A1 | 2/2002 | Berg et al. | |
| 2002/0029086 A1 | 3/2002 | Ogushi et al. | |
| 2002/0062367 A1 | 5/2002 | Debber et al. | |
| 2002/0077981 A1 | 6/2002 | Takatori et al. | |
| 2002/0078015 A1 | 6/2002 | Ponnekanti | |
| 2002/0080822 A1 | 6/2002 | Brown et al. | |
| 2002/0083183 A1 | 6/2002 | Pujare et al. | |
| 2002/0116643 A1 | 8/2002 | Raanan et al. | |
| 2002/0133723 A1 | 9/2002 | Tait | |
| 2002/0146026 A1* | 10/2002 | Unitt et al. | 370/428 |
| 2002/0146129 A1 | 10/2002 | Kaplan | |
| 2002/0184224 A1 | 12/2002 | Haff et al. | |
| 2002/0193966 A1 | 12/2002 | Buote et al. | |
| 2003/0005118 A1 | 1/2003 | Williams | |
| 2003/0005300 A1 | 1/2003 | Noble et al. | |
| 2003/0009538 A1 | 1/2003 | Shah et al. | |
| 2003/0023726 A1 | 1/2003 | Rice et al. | |
| 2003/0033545 A1 | 2/2003 | Wenisch et al. | |
| 2003/0055962 A1 | 3/2003 | Freund et al. | |
| 2003/0063750 A1 | 4/2003 | Medvinsky et al. | |
| 2003/0083991 A1 | 5/2003 | Kikinis | |
| 2003/0084350 A1 | 5/2003 | Eibach et al. | |
| 2003/0171885 A1 | 9/2003 | Coss et al. | |
| 2003/0179900 A1 | 9/2003 | Tian et al. | |
| 2003/0200439 A1 | 10/2003 | Moskowitz | |
| 2003/0204421 A1 | 10/2003 | Houle et al. | |
| 2003/0208448 A1 | 11/2003 | Perry et al. | |
| 2003/0208562 A1 | 11/2003 | Hauck et al. | |
| 2003/0217126 A1 | 11/2003 | Polcha et al. | |
| 2003/0217166 A1 | 11/2003 | Dal Canto et al. | |
| 2003/0220768 A1 | 11/2003 | Perry et al. | |
| 2003/0220821 A1 | 11/2003 | Walter et al. | |
| 2004/0006710 A1 | 1/2004 | Pollutro et al. | |
| 2004/0022191 A1 | 2/2004 | Bernet et al. | |
| 2004/0024764 A1 | 2/2004 | Hsu et al. | |
| 2004/0031058 A1 | 2/2004 | Reisman | |
| 2004/0049515 A1 | 3/2004 | Haff et al. | |
| 2004/0107342 A1 | 6/2004 | Pham et al. | |
| 2004/0107360 A1 | 6/2004 | Herrmann et al. | |
| 2004/0111410 A1 | 6/2004 | Burgoon et al. | |
| 2004/0139313 A1* | 7/2004 | Buer et al. | 713/150 |
| 2004/0142686 A1 | 7/2004 | Kirkup et al. | |
| 2004/0193606 A1 | 9/2004 | Arai et al. | |
| 2004/0193912 A1 | 9/2004 | Li et al. | |
| 2004/0214576 A1 | 10/2004 | Myers et al. | |
| 2004/0228362 A1 | 11/2004 | Maki et al. | |
| 2004/0230797 A1 | 11/2004 | Ofek et al. | |
| 2005/0010528 A1 | 1/2005 | Pelz et al. | |
| 2005/0015624 A1 | 1/2005 | Ginter et al. | |
| 2005/0027788 A1 | 2/2005 | Koopmans et al. | |
| 2005/0038779 A1 | 2/2005 | Fernandez et al. | |
| 2005/0132030 A1 | 6/2005 | Hopen et al. | |
| 2005/0185647 A1 | 8/2005 | Rao et al. | |

(56) References Cited

U.S. PATENT DOCUMENTS

| | | |
|---|---|---|
| 2005/0265351 A1 | 12/2005 | Smith et al. |
| 2005/0283822 A1 | 12/2005 | Appleby et al. |
| 2006/0005240 A1 | 1/2006 | Sundarrajan et al. |
| 2006/0068755 A1 | 3/2006 | Shraim et al. |
| 2006/0075464 A1 | 4/2006 | Golan et al. |
| 2006/0080441 A1 | 4/2006 | Chen et al. |
| 2006/0080667 A1 | 4/2006 | Sanghvi et al. |
| 2006/0090196 A1 | 4/2006 | Van Bemmel et al. |
| 2006/0198394 A1 | 9/2006 | Gotoh et al. |
| 2006/0218273 A1 | 9/2006 | Melvin |
| 2006/0245414 A1 | 11/2006 | Susai et al. |
| 2006/0248480 A1 | 11/2006 | Faraday et al. |
| 2006/0248580 A1 | 11/2006 | Fulp et al. |
| 2006/0271652 A1 | 11/2006 | Stavrakos et al. |
| 2006/0274774 A1 | 12/2006 | Srinivasan et al. |
| 2006/0277275 A1 | 12/2006 | Glaenzer |
| 2006/0277591 A1 | 12/2006 | Arnold et al. |
| 2006/0282545 A1* | 12/2006 | Arwe et al. ............... 709/237 |
| 2006/0282876 A1 | 12/2006 | Shelest et al. |
| 2007/0038618 A1 | 2/2007 | Kosciusko et al. |
| 2007/0061434 A1 | 3/2007 | Schmieder et al. |
| 2007/0113269 A1 | 5/2007 | Zhang |
| 2007/0136317 A1 | 6/2007 | Przywara |
| 2007/0192853 A1 | 8/2007 | Shraim et al. |
| 2007/0271592 A1 | 11/2007 | Noda et al. |
| 2007/0283014 A1* | 12/2007 | Shinomiya et al. ........... 709/225 |
| 2007/0294762 A1 | 12/2007 | Shraim et al. |
| 2007/0299915 A1 | 12/2007 | Shraim et al. |
| 2008/0005779 A1 | 1/2008 | Takenaka et al. |
| 2008/0008202 A1 | 1/2008 | Terrell et al. |
| 2008/0215889 A1 | 9/2008 | Celik et al. |
| 2009/0158384 A1 | 6/2009 | Kanade et al. |
| 2009/0210364 A1 | 8/2009 | Adi et al. |
| 2010/0037284 A1 | 2/2010 | Sachs |
| 2010/0223222 A1 | 9/2010 | Zhou et al. |
| 2010/0235879 A1 | 9/2010 | Burnside et al. |
| 2011/0280215 A1 | 11/2011 | Nakagawa et al. |
| 2012/0051529 A1 | 3/2012 | Dobbins et al. |
| 2012/0096513 A1 | 4/2012 | Raleigh et al. |
| 2012/0304277 A1 | 11/2012 | Li et al. |

FOREIGN PATENT DOCUMENTS

| | | |
|---|---|---|
| EP | 1 418 730 | 5/2004 |
| EP | 1 641 215 | 3/2006 |
| JP | 06097905 | 8/1994 |
| JP | 11205388 A | 7/1999 |
| JP | 2001306521 | 2/2001 |
| JP | 2003008651 | 10/2003 |
| WO | WO-01/33759 | 5/2001 |
| WO | WO-01/38995 | 5/2001 |
| WO | WO-02/079949 | 10/2002 |
| WO | WO-2005/066737 A1 | 7/2005 |

OTHER PUBLICATIONS

Darryle Merlette, Dr. Parag Pruthi; Network Security; NetDetector: Identifying Real Threats and Securing Your Network; Copyright © 2003 Niksun, Inc., Monmouth Junction NJ, USA.

Darryle Merlette; Spencer Parker, Dr. Parag Pruthi; Niksun Network Security; NetDetector: Monitoring and Minimizing Instant Messaging Risks; Copyright © 2003 Niksun, Inc., Monmouth Junction NJ, USA.

International Search Report for International Application No. PCT/US2008/007984; Completed Aug. 22, 2009; Mailed Sep. 3, 2009.

International Search Report for PCT Application No. PCT/US2004/043405; Completed Mar. 15, 2005; Mailed Mar. 23, 2005.

Japanese Office Action on 2006-547397 dated Jul. 5, 2011.

Notice of Allowance for U.S. Appl. No. 10/423,444 dated Nov. 16, 2009.

Notice of Allowance on U.S. Appl. No. 10/583,578 dated Mar. 27, 2012.

Office Action for Japanese Application 2006-547397 dated Nov. 30, 2010.

Office Action for U.S. Appl. No. 10/423,444 dated Mar. 14, 2008.

Office Action for U.S. Appl. No. 10/423,444 dated Jul. 27, 2009.

Office Action for U.S. Appl. No. 10/423,444 dated Jun. 13, 2006.

Office Action for U.S. Appl. No. 10/423,444 dated Mar. 12, 2007.

Office Action for U.S. Appl. No. 10/423,444 dated Sep. 19, 2008.

Office Action for U.S. Appl. No. 10/423,444 dated Sep. 7, 2007.

Office Action for U.S. Appl. No. 12/163,292 dated Aug. 8, 2011.

Office Action for U.S. Appl. No. 12/163,292 dated Feb. 2, 2011.

Office Action for U.S. Appl. No. 10/423,444 dated Dec. 2, 2008.

Office Action for U.S. Appl. No. 10/423,444 dated Feb. 25, 2009.

Office Action on U.S. Appl. No. 10/583,578 dated Jun. 24, 2010.

Office Action on U.S. Appl. No. 10/583,578 dated Feb. 11, 2011.

Office Action on U.S. Appl. No. 10/583,578 dated Jul. 19, 2011.

Office Action on U.S. Appl. No. 12/267,804 dated Apr. 10, 2012.

Office Action on U.S. Appl. No. 12/267,804 dated Aug. 16, 2011.

Office Action on U.S. Appl. No. 12/267,804 dated Apr. 25, 2011.

Office Action on U.S. Appl. No. 12/270,278 dated Nov. 9, 2011.

Office Action on U.S. Appl. No. 12/270,278 dated Jun. 24, 2011.

Office Action on U.S. Appl. No. 12/406,613 dated Mar. 20, 2012.

Office Action on U.S. Appl. No. 12/406,613 dated Oct. 24, 2011.

Scarfone et ai, Guide to Intrusion Detection and Prevention Systems (IOPS), Feb. 2007, NIST, Special Publication 800-94.

Written Opinion of the International Search Authority for PCT Application No. PCT/US2004/043405; Completed Mar. 15, 2005; Mailed Mar. 23, 2005.

Office Action on U.S. Appl. No. 12/432,186 dated Jun. 25, 2012.

US Notice of Allowance on U.S. Appl. No. 12/267,804 dated Apr. 24, 2013.

US Office Action on U.S. Appl. No. 12/267,804 dated Sep. 27, 2012.

US Office Action on U.S. Appl. No. 12/432,186 dated Feb. 21, 2013.

US Notice of Allowance for U.S. Appl. No. 12/163,292 dated Aug. 6, 2014.

US Office Action for U.S. Appl. No. 12/270,278 dated Feb. 20, 2014.

US Office Action for U.S. Appl. No. 12/163,292 dated Apr. 25, 2014.

US Office Action for U.S. Appl. No. 12/270,278 dated Aug. 15, 2014.

US Office Action for U.S. Appl. No. 12/406,613 dated Jun. 9, 2014.

US Notice of Allowance for U.S. Appl. No. 12/432,186 dated Sep. 10, 2014.

US Office Action for U.S. Appl. No. 12/406,613 dated Oct. 6, 2014.

* cited by examiner

SYSTEM AND METHOD FOR USING VARIABLE SECURITY TAG LOCATION IN NETWORK COMMUNICATIONS

CROSS REFERENCE TO RELATED APPLICATIONS

This application claims the benefit of U.S. Provisional Application No. 60/986,833, filed Nov. 9, 2007, entitled "System And Method For Using Variable Security Tag Location In Network Communications" the contents of which are hereby incorporated by reference.

FIELD OF THE INVENTION

This invention relates to computer system security and, more particularly, to a system and method for improved reliability in secure packet communication systems.

BACKGROUND OF THE INVENTION

Computer system resources such as web servers and database services may be directly accessible through networks such as LANs, WANs, and the Internet. Communication between computer systems over a network typically takes place through transmitted data structures called packets. A packet may include data being transported from one system to another system. Such data is generally referred to as payload. A packet may also include other data that defines the structure and nature of the packet, including information indicating the origin and destination of the packet and information indicating other packet characteristics. A stream of packets may constitute a communication from one system to another system.

SUMMARY OF THE INVENTION

The invention may be embodied as a method or system for inserting a security tag into a packet in one or more locations within the packet so that the packet may pass through a number of network impediments with the security tag or tags intact.

The sending node and receiving node may determine security tag placement using different methods. They may negotiate placement when they first establish secure communications. The sending node may determine placement based on known network impediments between it and the receiving node. The sending node may send a test packet to the receiving node to determine locations where security tags are removed and then determine placement based on the results (the received test packet). The sending node may arbitrarily or randomly determine one or more placement locations in each packet and the receiving node may check for the security tag in various placement locations when it receives the packet.

By providing a variety of security tag placement locations within a packet and then determining one or more locations to overcome network impediments between the sending node and the receiving node, secure communications may be enabled using security tags in network environments that may not typically allow such security tags within packets.

BRIEF DESCRIPTION OF THE DRAWINGS

The invention is best understood from the following detailed description when read in connection with the accompanying drawings. According to common practice, various features/elements of the drawings may not be drawn to scale. Common numerical references represent like features/elements. The following figures are included in the drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Direct user/client access through networks such as LANs, WANs, and the Internet may make them vulnerable to malicious trespasses. Computer security systems may prevent such trespasses by authenticating users that desire to use resources and then ensuring that the communications between authenticated users and resources are not taken over by outside entities intent on malicious trespass.

One method to maintain secure communications via packets is to insert a security tag into each packet. The security tag may include information that the sender and receiver may verify, and, thus ensures to the receiver that the packet is from a known (verified) sender and, for example, is not from an outside source that is attempting to break into a stream of packets. It may also ensure that the packet's payload has not been altered during transmission.

A security tag within a packet, however, may not make it through (across) a network. Different network elements that check (verify) packets as the packets pass through the network may, for example, remove the security tag from a passing packet. A proxy server may, for example, consider a security tag as extraneous data and remove it, or stateful firewalls and intrusion detection systems may misinterpret the security tag and generate false alarms. In such cases, these network element (impediments) may reduce or eliminate the effectiveness of the security of the communication.

Figure 1A:
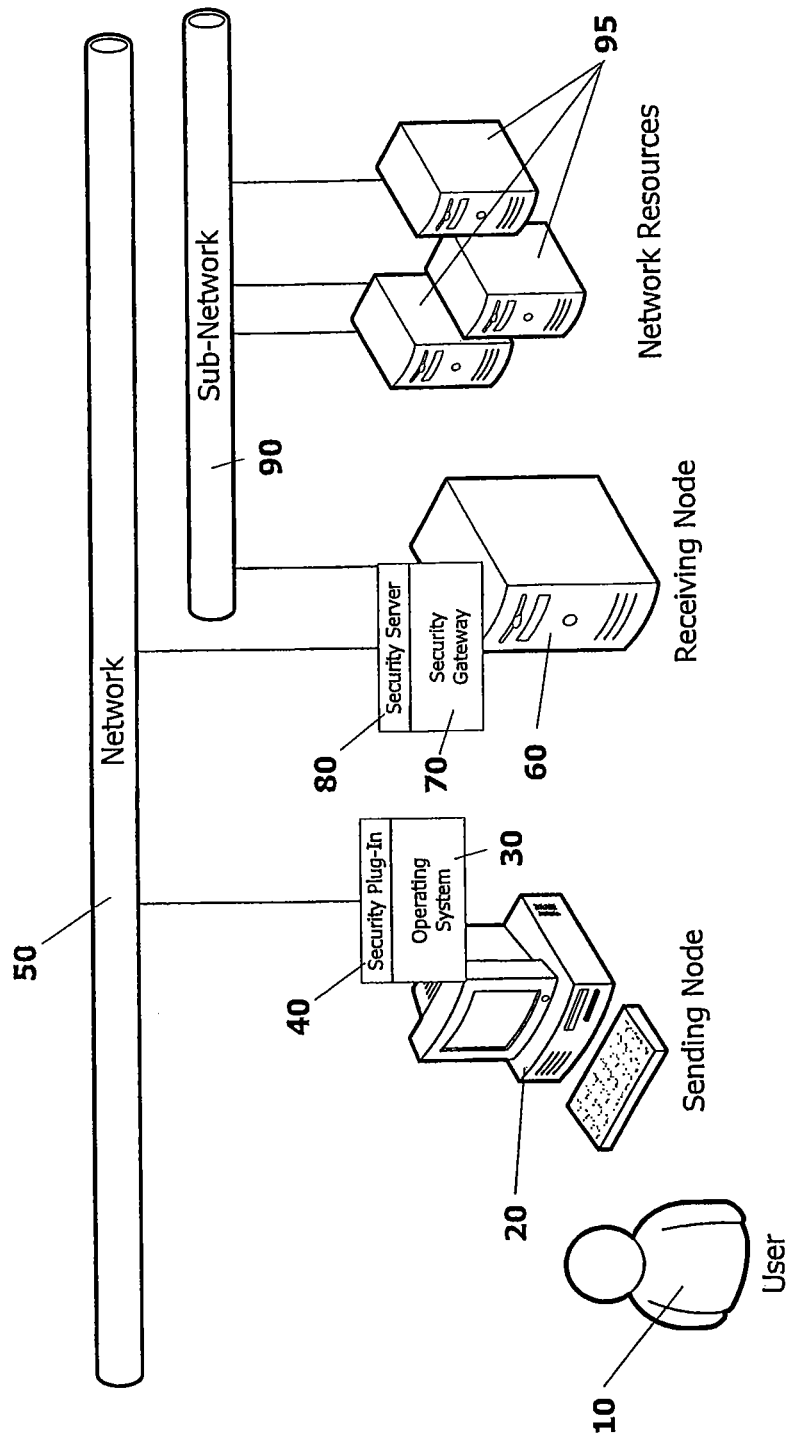
FIG. 1A is a schematic diagram illustrating a network using secure communications in accordance with an exemplary embodiment of the invention.

FIG. 1A is a schematic diagram illustrating an exemplary network (environment) for secure communications using variable placement locations for placement of a security tag.

Referring to FIG. 1A, a user 10 may work with (operate) a sending node 20, which may be a personal computer or other computing device. Sending node 20 may have an operating system (OS) 30 that allows sending node 20 to communicate via a network 50 with other devices.

In certain exemplary embodiments, a security plug-in 40 that may run within OS 30, may examine (analyze) and/or may modify packets sent by sending node 20. In other exemplary embodiments, the security plug-in may be an application program, other program or hardware module executing on sending node 20.

A receiving node 60 may be a gateway to a sub-network 90 of network 50 that connects to one or more network resources 95 such as web servers, database servers, and other services that user 10 may desire to access. A security gateway 70 (e.g., a program or hardware module) may run on receiving node 60. A security server 80 may run as part of security gateway 70 to examine and/or modify incoming packets and may communicate with sending node 20 via sub-network 90 and/or network 50.

Although the security plug-in and security gateway are illustrated in the network application and security server, respectively, the security plug-in and security gateway may be provided in any device on the network or sub-network that interacts with the stream of packets being secured.

Figure 1B:
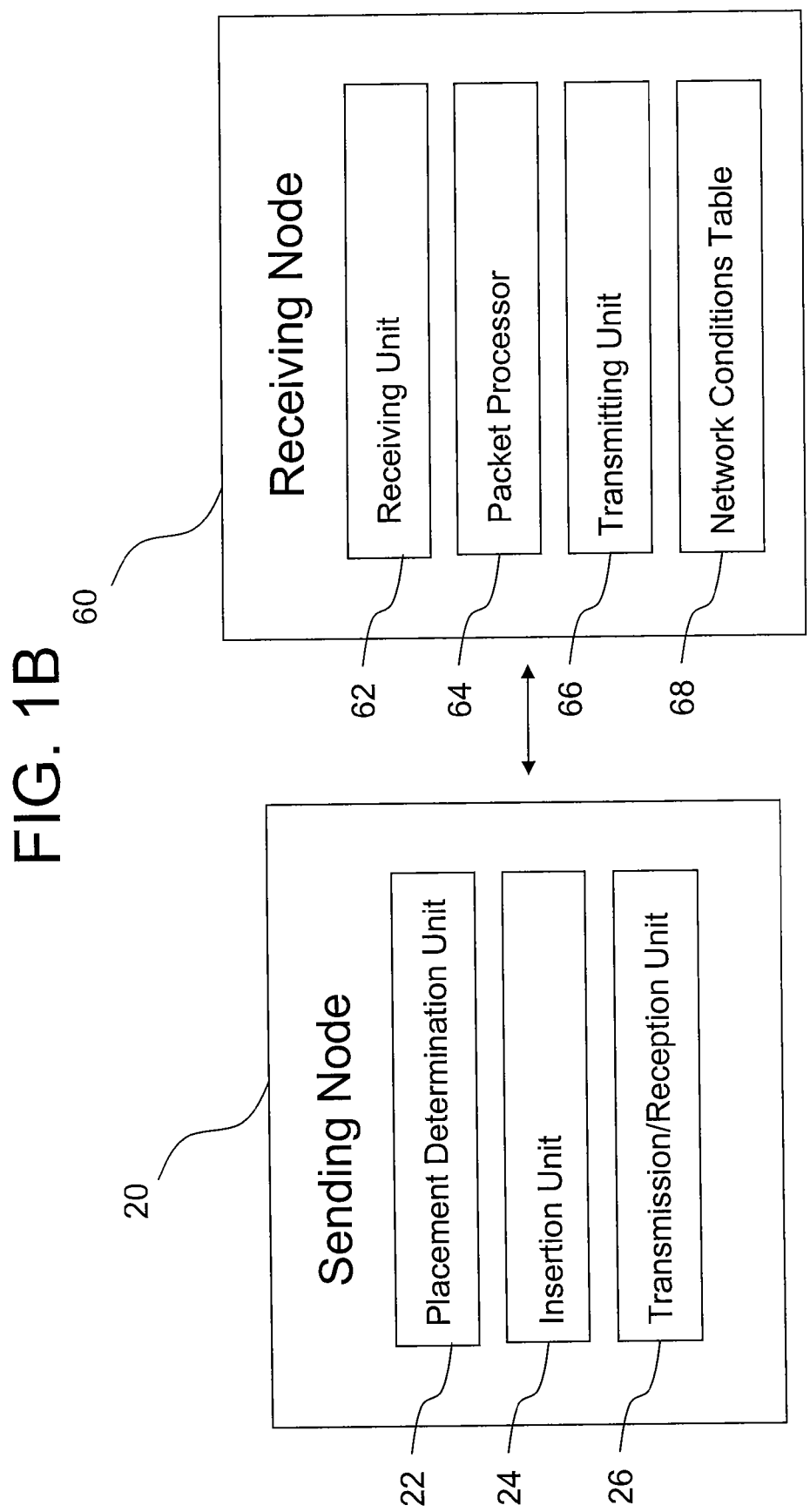
FIG. 1B is a schematic diagram of sending and receiving nodes in accordance with an exemplary embodiment of the invention.

Referring to FIG. 1B, sending node 20 may include: (1) a placement determination unit 22 for selecting at least one placement location among a plurality of locations for the security tag to be embedded in each of the plurality of packets; (2) an insertion unit 24 for inserting the security tag at the at least one placement location for each of the packets; and (3) a transmission/reception unit 26 for transmitting/receiving information such as transmission of the tagged packets from sending node 20 toward receiving node 60.

In certain exemplary embodiments, receiving node 60 may include: (1) a receiving unit 62 for receiving the tagged packets from sending node 20; (2) a packet processor 64 for authenticating each of the security tags of the tagged packets, and (3) a transmitting unit 66 for transmitting information such as the network conditions table 68.

Figure 2:
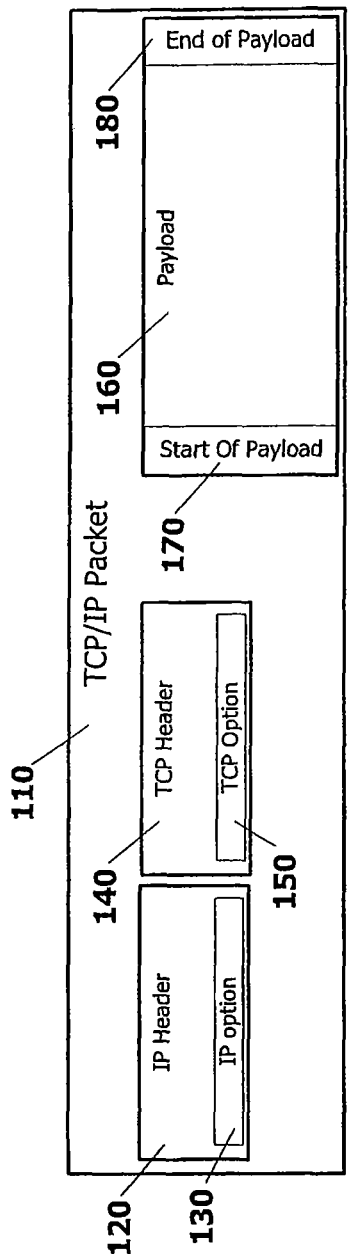
FIG. 2 is a data schema of an exemplary packet structure illustrating variable placement locations for a security tag in accordance with another exemplary embodiment of the invention.

FIG. 2 is a data schema illustrating an exemplary packet structure (i.e., a Transmission Control Protocol/Internet Protocol (TCP/IP) packet 110 structure) that may be used to transport data between sending node 20 and receiving node 60. FIG. 2 illustrates exemplary locations 130, 150, 170 and 180 within packet 110 where a security tag may be inserted to secure (verify) the packet (including its origin). Other placement locations are also possible.

A TCP/IP packet may include; (1) an IP header 120 that includes Internet Protocol (IP) information about packet 110; (2) a TCP header 140 that includes transmission control protocol information about packet 110; and (3) payload 160 may include data that one node requested to send to another node. IP header 120 may include an IP option field 130 that may include optional information. The TCP header 140 may include a TCP option field 150 that may include optional information. The payload 160 may include any kind of data or information a node desires to communicate to another node.

In certain exemplary embodiments, security plug-in 40 may insert a security tag in one or more placement locations within the packet 110 (e.g., in the IP option field 130, in the TCP option field 150, at the start of the payload field 170, at the end of the payload field 180 and/or, anywhere within the payload).

If the security tag is inserted in either IP option field 130 or TCP option field 150, the option field having the inserted security tag may start with an op-code, (for example, a one-byte value that may indicate the rest of the contents of the option field. The op-code value may be inserted in TCP or IP option field 130 or 150 to specify to receiving node 60 that the TCP or IP option field 130 or 150 includes a security tag.

Figure 3A:
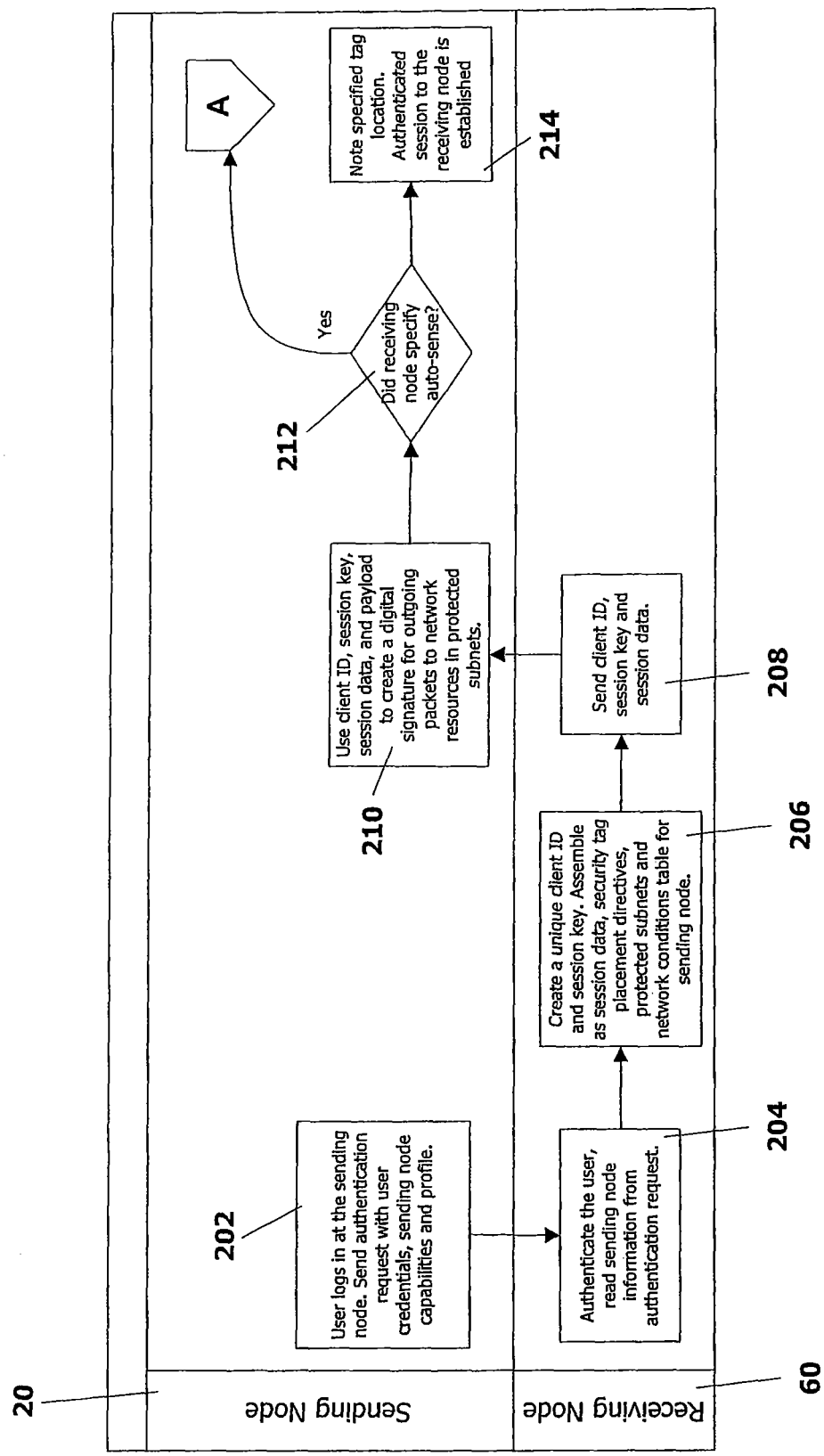
FIGS. 3A and 3B are flow charts illustrating a method of creating an authenticated session between a sending node and a receiving node and of determining a location in which to insert a security tag in packets sent to the receiving node in accordance with yet another exemplary embodiment of the invention.
Figure 3B:
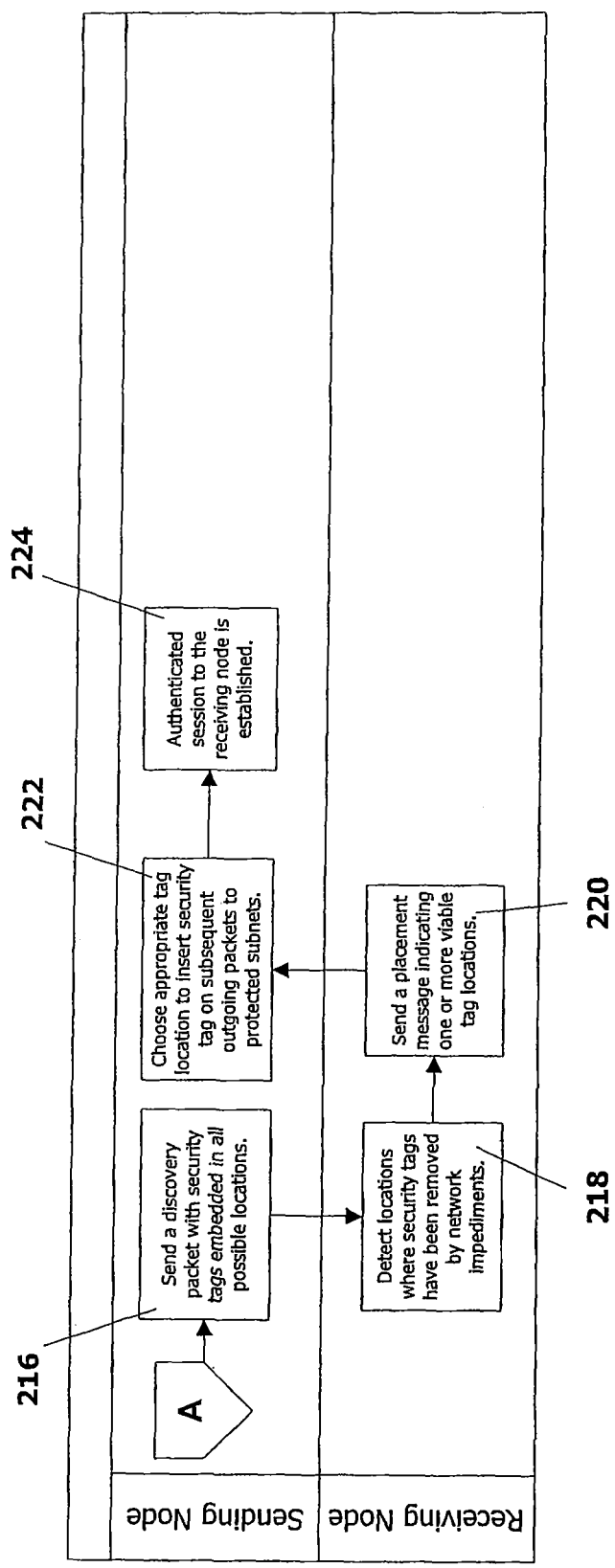

FIGS. 3A and 3B are flow charts illustrating a method of using variable placement locations for inserting a security tag. The method includes, for example, sensing a user's 10 request to login to the sending node 20 and then to use a protected network resource 95, and the action taken for initiating an authenticated session in which user 10 communicates with a network resource 95.

Now referring to FIGS. 3A and 3B, the sending node 20, may include an operating system plug-in 40 and the receiving node 60 may include the security server 80.

At block 202 when user 10 logs into a network-connected computer and presents user credentials, such as user name and password, sending node 20 may send an authentication request including the user credentials along with information about the sending node's capabilities and a profile of sending node 20. This information about sending node 20 may be pre-established. For example, such information may be entered into security plug-in 40 when it was installed on sending node 20.

At block 204, receiving node 60 authenticates user 10 using the information in the request and an authentication server, such as a Light Directory Access Protocol (LDAP) server, that may be accessed by receiving node 60. Receiving node 60, may also read packet data from the packets that include the log-in information. The packet data may indicate to receiving node 60, sending node's 20 (i) IP address, (ii) system health status (e.g., security compliance information), (iii) host capabilities and/or (iv) profile.

At block 206, receiving node 60 may then create a unique client ID and session key for user 10 for the authenticated session. Receiving node 60 may also assemble session data that may include security tag directives, a list of protected subnets that are available through receiving node 60, and a network conditions table 310 (shown in FIG. 4) for sending node 20. The list of protected subnets and the network conditions table 310 may be stored in a location accessible by receiving node (60).

Security tag directives may specify a tag location in a TCP/IP packet that sending node 20 may use when it inserts a security tag into outgoing packets traversing through receiving node 60. If the security tag directives specify an IP option location or a TCP option location, then an op-code value may also be specified for IP/TCP option field 130 or 150 to indicate that it contains a security tag.

In various exemplary embodiments, security tag directives may also specify that sending node 20 may auto sense a tag location. That is, sending node 20 may automatically determine the best (optimum) security tag location by performing an automated test procedure.

At block 208, receiving node 60 may send a client ID, a session key, and any other relevant connection data to sending node 20. At block 210, sending node 20 may use the client ID, the session key, and the other session data, as appropriate, to create a digital signature for the outgoing packet. The digital signature may be created in many ways including hashing the client ID with all or part of the packet's payload using the session key.

At block 212, sending node 20 may check whether receiving node 60 specified an auto-sense, as a security tag directive. If receiving node 60 did not specify the auto-sense, at block 214, sending node 20 checks for (e.g., notes) the tag location that receiving node 60 may have specified. Sending node 20 has then established an authenticated session to receiving node 60 for user 10.

If receiving node 60 specified the auto-sense, as a security tag directive, at block 216, sending node 20 may insert a security tag at each possible location (e.g., in the IP header field, in the TCP header field, and/or the beginning or end of the payload field) in a test packet and may send the test packet to receiving node 60.

At block 218, receiving node 60 may check for security tags in each possible location and may detect from which locations the security tags have been removed by the network impediments. At block 220, receiving node 60 may send a placement message to sending node 20. The placement message may indicate one or more successful tag locations (e.g., locations which were not affected by the network impediments). At block 222, sending node 20 may choose one of those tag locations.

In certain exemplary embodiments, the tag locations are prioritized such that when the successful tag locations are determined, sending and receiving nodes 20 and 60 both determine the actual tag location based on the predetermined prioritization.

At block 224, sending node 20 establishes an authenticated session to receiving node 60 for user 10.

Figure 4:
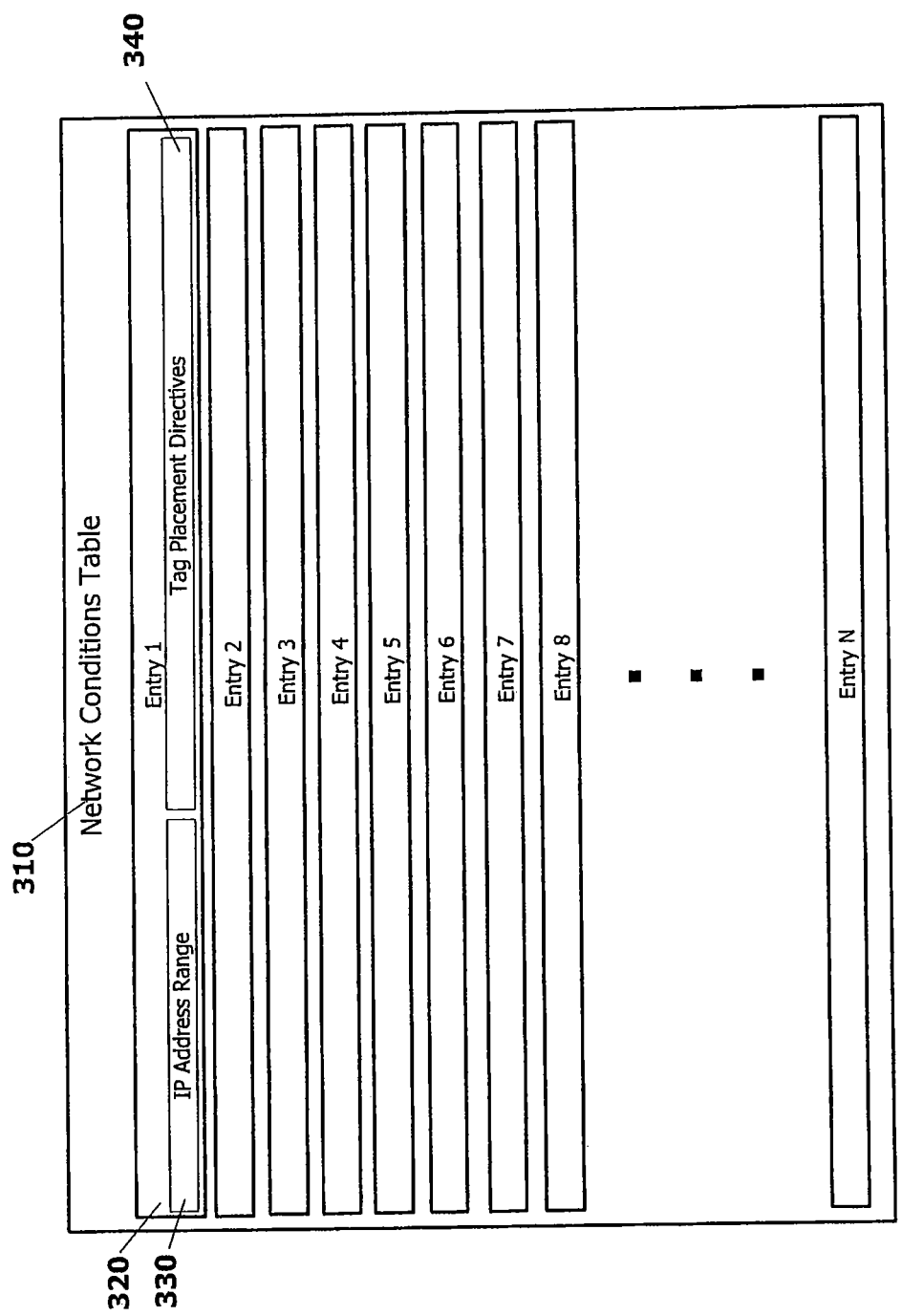
FIG. 4 is a block diagram illustrating a network conditions table in accordance with various embodiments of the invention.

FIG. 4 is a block diagram illustrating a network conditions table in accordance with various embodiments of the invention.

Now referring to FIG. 4, network conditions table 310 may be sent by receiving node 60 to sending node 20 when sending node 20 establishes the authenticated session. Table 310 may include a set of entries 320. Each entry 320 may include an IP address range 330 that may specify a network address and subnet mask, and tag placement directives 340 that are provisioned based on information related to, for example, location and type of network impediments (e.g., predetermined network impediments) located between sending node 20 and receiving node 60 that may remove security tags from packets. Sending node 60 may read network conditions table 310 to determine if sending node 20 is located at an IP address defined within the IP address ranges in network conditions table 310 and, if so, to determine one or more tag locations most likely to carry a security tag intact over network 50 to receiving node 60.

Figure 5A:
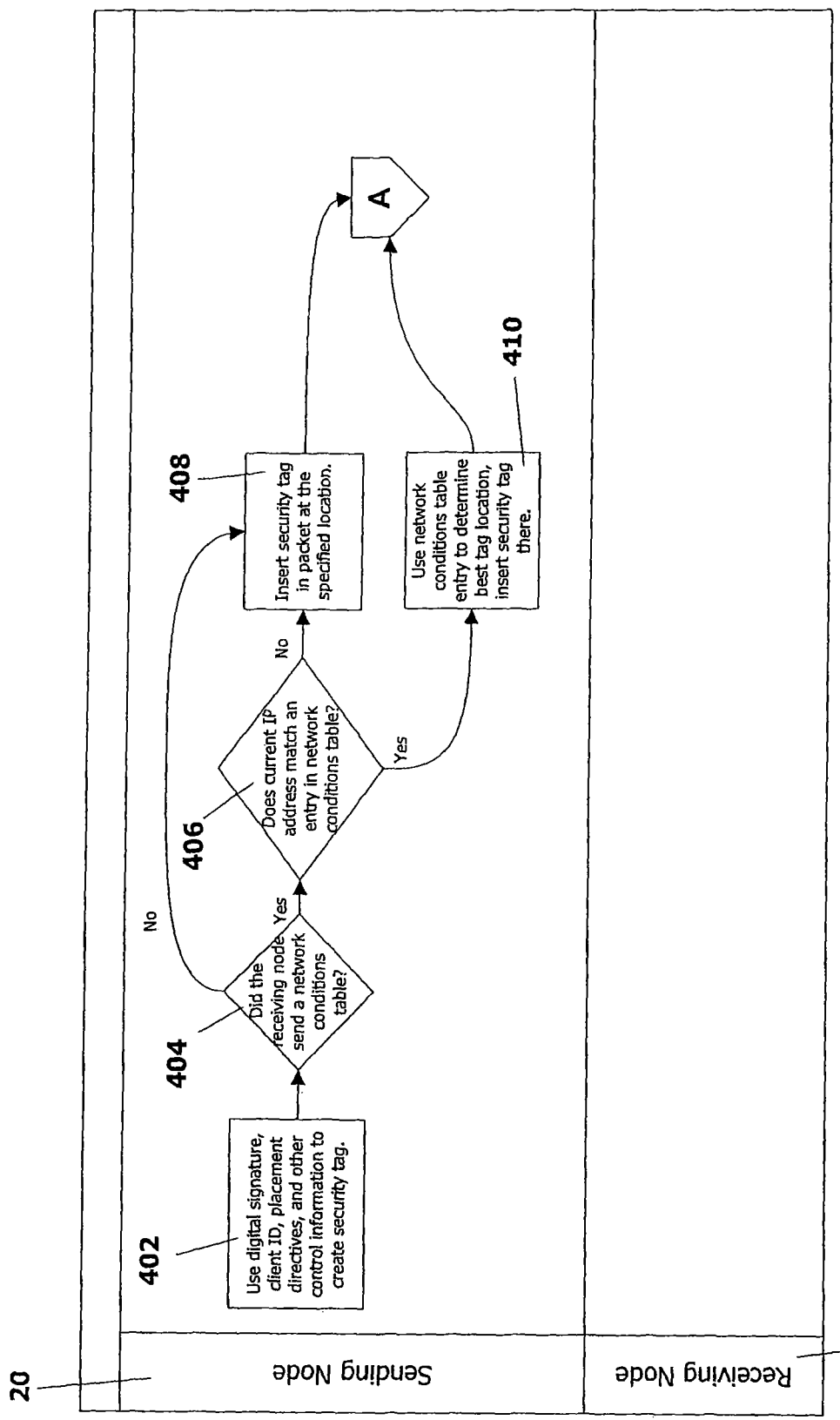
FIGS. 5A, 5B and 5C are flow charts illustrating a method of sending packets from a sending node to a receiving node over an authenticated session and of finding and reading the security tags in the packets when the receiving node receives the packets in accordance with yet another exemplary embodiment of the invention.
Figure 5B:
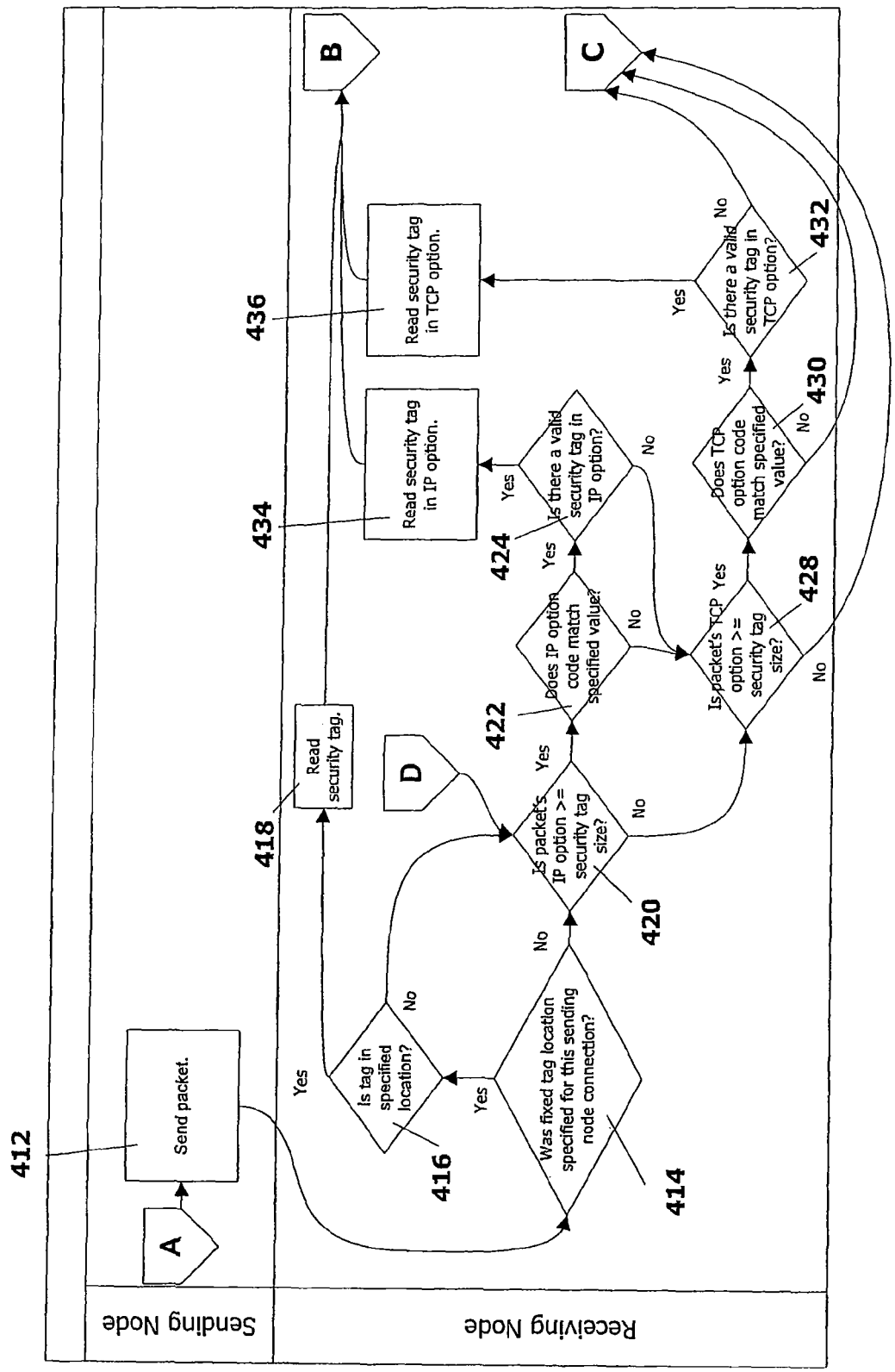
Figure 5C:
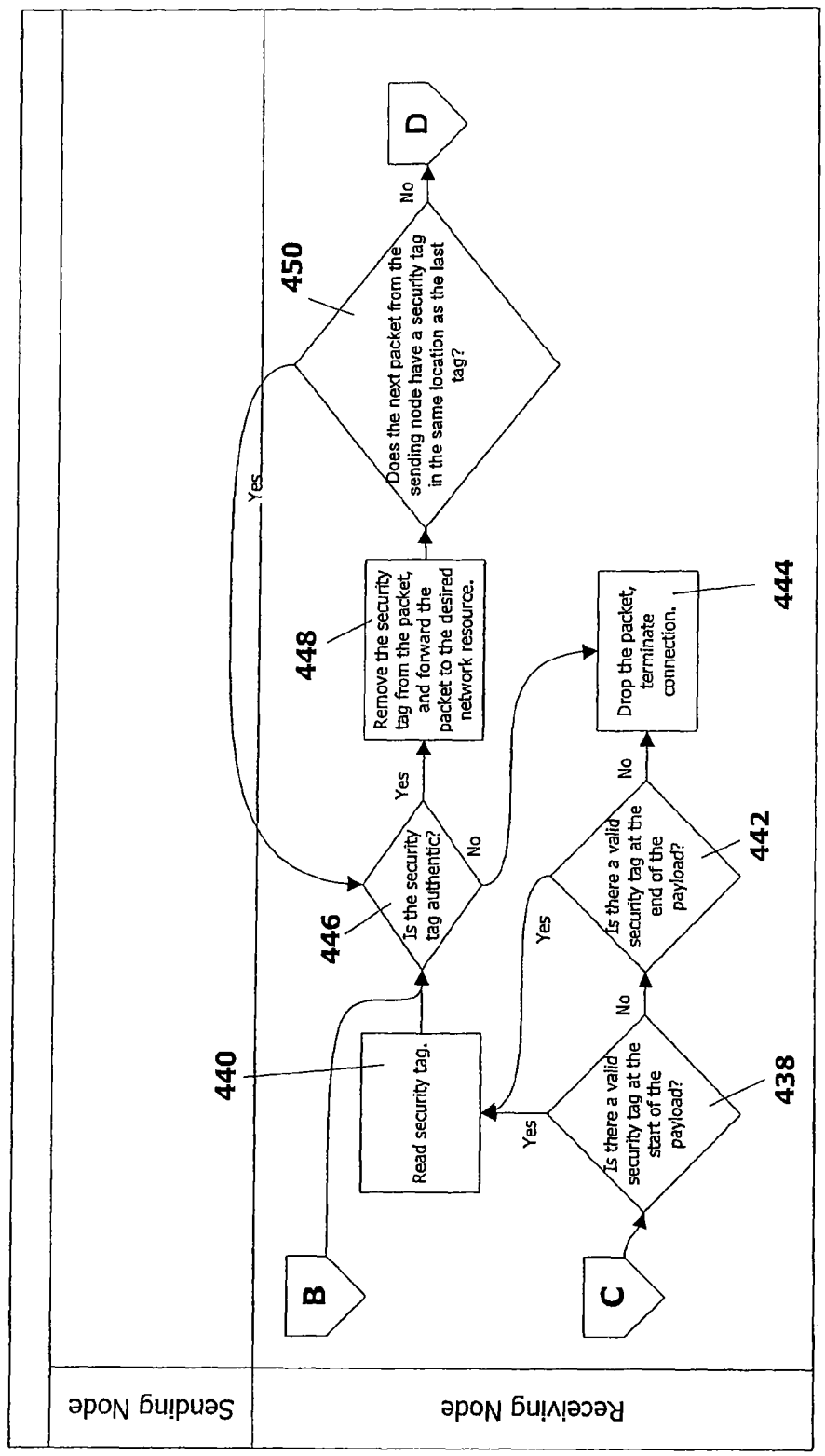

FIGS. 5A, 5B and 5C are flow charts illustrating a method of sending packets from sending node 60 to receiving node 20 over an authenticated session and of finding and reading security tags in the packets when receiving node 60 receives the packets in accordance with yet another exemplary embodiment of the invention.

Referring to FIGS. 5A, 5B and 5C, at block 402, when sending node 20 detects that an outgoing packet is destined for (going to) protected network resource 95 or protected network 90 to which sending node 20 has an authenticated session, sending node 20 may use the digital signature, client ID, placement directives, and other control information sent by receiving node 60 to create a security tag.

At block 404, sending node 20 may check whether receiving node 60 sent network conditions table 310. If not, at block 408 sending node 20 may insert a security tag in the packet at the specified location. The specified location was previously determined when sending node 20 established the authenticated session with receiving node 60 for user 10.

At block 406, if receiving node 60 sent network conditions table 310, sending node 20 may check network conditions table 310 to determine if the sending node's current IP address is within the IP address ranges 320 defined by entries in network conditions table 310. At block 408, if the current IP address is not defined within an IP address range in the network conditions table 310, sending node 20 may insert the security tag in the packet at the specified location.

At block 410, if the current IP address is defined in an IP address range in the network conditions table 310, sending node may read the table entry's tag placement directives 330 to determine network impediments which are located between sending and receiving nodes 20 and 60. Sending node 20 may determine the tag location or locations that are most likely to carry the security tag intact over network 50 and may insert the security tag at one or more of these locations.

At block 412, sending node 20 may send the packet with the security tag to receiving node 60. At block 414, when receiving node 60 receives the packet from sending node 20, receiving node 60 may determine whether or not it previously specified a fixed tag location to sending node 20. At block 416, if receiving node 60 specified a fixed location, receiving node 60 may check for the security tag in the specified location. At block 418, if receiving node 60 locates (finds) the security tag at the specified location, it may read the security tag and, at block 446, may check whether the security tag is authentic.

Many different methods for authentication are possible including receiving node 60 reading the client ID in the security tag, retrieving the session key it created for that user for the authenticated session, then hashing the client ID with the packet's payload using the session key and checking the resultant value against the digital signature contained in the security tag.

At block 420, if receiving node 60 had not previously specify a fixed tag location, or if receiving node 60 is unable to allocate the security tag in the fixed location, receiving node 60 may check a size of the packet's IP option field. At block 422, if the IP option field size is greater than or equal to the security tag size, receiving node 60 may check the op code value of IP option field 130 to determine if it matches the op code value receiving node 60 previously specified when it first negotiated the session information with sending node 20. At block, 424, if so, receiving node 60 may read IP option field 130 to determine if it finds a valid security tag. At block 428, if the size of IP option field 130 is less than the size of the security tag, if receiving node 60 does not find the specified op code value in IP option field 130 or if receiving node 60 cannot find a valid security tag, receiving node 60 may check TCP option field 150. At block 424, if receiving node 60 finds a valid security tag, receiving node 60 may read the security tag in IP option field 130 and then at block 446 may check to determine if the security tag is authentic.

If receiving node 60 does not find a security tag in IP option field 130, it may check the size of the packet's TCP option field 150. At block 430, if the TCP option field size is greater than or equal to the security tag size, receiving node 60 may check the TCP option's op code value to determine if it matches the specified op code value the receiving node 60 previously specified when it first negotiated the session information with sending node 20. At block 432, if receiving node 60 does find the specified op code value, receiving node may read TCP option field 150 to determine if it finds a valid security tag. At block 438, if the option field size is less than the size of the security tag, if receiving node 60 does not find the specified op code value in TCP option field 130, or if receiving node 60 does not find a valid security tag, receiving node 60 may check the start of the payload field 170. At block 436, if the node finds a valid security tag, receiving node 60 may read the security tag in TCP option field 150 and then, at block 446, may check to determine if the security tag is authentic.

If receiving node 60 does not find a security tag in TCP option field 150, it may read the start of the packet's payload field 160 to determine if there is a valid security tag. If so, at block 440, receiving node 60 may read the security tag and then, at block 446, may check to determine if the security tag is authentic.

At block 442, if no security tag is located in the start of the payload field 170, receiving node 60 may read the end of the packet's payload field 180 to determine if there is a valid security tag. If so, at block 440, receiving node 60 may read the security tag and then, at block 446, may check whether the security tag is authentic. If no security tag is located at the start or end of the payload field 170 or 180, receiving node 60 has not found a valid security tag and, at block 444, may drop the packet (e.g., to prevent or restrict access by the packet to the protected resource 95 and/or the protected network 90), thus blocking access to the protected resource 95 and/or the protected network 90. In certain exemplary embodiments receiving node 60 may quarantine the packet and/or send the packet elsewhere for analysis.

At block 448, if the security tag is authentic, receiving node 60 may remove the security tag from the packet and may send the packet to the desired network resource located behind (after) security gateway 70. In certain exemplary embodiments, security gateway 70 may include receiving node 60.

At block 450, when a subsequent packet for this authenticated session arrives at receiving node 60, receiving node 60 may check the same tag location where it found the security tag in the last session packet. At block 446, if receiving node 60 finds a security tag at the same location, it may determine the security tag's authenticity. If receiving node 60 does not find a security tag at the same location, it may continue processing at block 420 and search for the security tag in other locations.

The security system and the method for inserting a security tag at variable locations in a packet disclosed herein have diverse applicability in a range of markets including financial services, wireless LAN (e.g., wireless sales force automation and contractor services), and government regulated markets such as banking and health care, among others.

Although tag location are disclosed as being selected using either placement messages, network conditions tables or auto sense procedures, it is also possible that sending node may insert the security tags randomly or at a predetermined location or locations and then may send the packet with the security tag. In such cases, it is possible for the receiving node to check for security tags in packets and to drop packets, for example, when a valid security tag is not found within a predetermined number of packets or after a predetermined timeframe from the last valid security tag.

Although the sending node is shown as inserting a single security tags in each packet sent to the receiving node, it is contemplated that the sending node may select one or more of tag locations and may insert the security tag into the first packet, each packet or selected packets (periodically or pseudo-randomly) of the session according to network security levels indicated by receiving node 60.

Although verification of the security tag in placement locations is illustrated in a particular order (e.g., checking the IP option field, the TCP option field and then the payload), the verification may occur in any order. Moreover, the order of such checking may be based on any known network impediments.

Although various embodiments of the present invention have been described in terms of creating secure connections between nodes in a network, it is not limited thereto. The methods may be carried out between networks, for example, using any number of different protocols.

Although various embodiments of the present invention have been described in terms of messages being transmitted between client and server, it is not limited thereto. The identification techniques disclosed herein apply to communications transmitted with respect to a wide range of computer applications, and are not limited to server applications.

The terms message and communication as used herein are intended to refer to a broad class of transmissions carried out between computer systems or portions thereof; for example, inquiries, data updates, data edits, and data requests, among others.

As described herein, for example, the invention may be embodied in software, in a machine (e.g., a computer system, a microprocessor based appliance, etc.) that includes software in memory, or in a tangible computer storage carrier configured to carry out the protection scheme (e.g., in a self contained silicon device, a solid state memory, an optical disc, a magnetic disc, etc.). Further, when the invention is embodied in a remote system for a user to access a resource, the remote system is not limited to an application server, and the resource is not limited to an application on an application server. It is contemplated that the security system may be included in other layers of the network such as the network layer, or firewall layer of combinations of the other layers.

As described herein, the remote system may be any remotely accessible microprocessor based device (e.g., a PDA, a personal computer, a network server, etc.), and the resource may be any resource installed on (or accessible through a connection to) the remotely accessible device.

Although the invention is illustrated and described herein with reference to specific embodiments, the invention is not intended to be limited to the details shown. Rather, various modifications may be made in the details within the scope and range equivalents of the claims and without departing from the invention.

What is claimed:

1. A method for processing a security tag in each packet of a packetized communication, the packets being transmitted to a receiving node in a network, the security tag including information relating to at least a user, the method comprising the steps of:

receiving, at the receiving node, a first packet from a sending node, the first packet comprising a plurality of placement locations each with a tag;

detecting, at the receiving node, if at least one of the tags at one or more of the plurality of placement locations in the first packet has been removed or changed based on one or more network characteristics that can remove or change a security tag in a packet from the sending node to the receiving node;

sending, by the receiving node to the sending node, at least one tag placement directive generated based on the detection, the at least at least one tag placement directive indicating at least one placement location among the plurality of locations to embed a security tag in each packet of a packetized communication, the at least one placement location selected to carry the security tag unchanged over the network across one or more intermediaries to the receiving node;

receiving, at the receiving node, each packet of the packetized communication, each packet having the embedded security tag;

authenticating, at the receiving node, the embedded security tag in each packet; and if a respective packet of the packetized communication is received by the receiving node without the security tag embedded in the selected placement location, preventing access by the respective packet which does not have the security tag embedded in the selected placement location to a secured resource.

2. The method according to claim 1, wherein the authenticating of the security tag in each packet of the packetized communication includes:
   if a location placement message had been sent by the receiving node, checking a location in each packet of the packetized communication indicated by the location placement message for the security tag; and
   determining if the security tag at the checked location is authentic.

3. The method according to claim 1, wherein the authenticating of the security tag in each packet of the packetized communication includes:
   if the receiving node had not previously specify a fixed tag location, or if the receiving node is unable to locate the security tag in the fixed tag location, checking, by the receiving node, a size of one or both of: (1) an IP option field; or (2) a TCP option field of the respective packet of the packetized communication;
   if the size of the IP option field or the TCP option field for the respective packet is greater than or equal to a size of the security tag embedded in the respective packet, determining for the option field or fields that are greater than or equal to the size of the security tag, if the security tag is embedded in the IP option field or TCP option field;
   if the security tag is embedded in either the IP option field or the TCP option field, determining for each packet of the packetized communication if the security tag in the determined option field is authentic.

4. The method according to claim 3, wherein the authenticating of the security tag in each packet of the packetized communication further includes:
   if the size of the IP option field and the TCP option field for the respective packet is less than the size of the security tag, checking a beginning and an ending of a payload field of the respective packet to determine whether the security tag is located therein; and
   if the security tag is located in the beginning or the end of the payload field of the respective packet, determine for each packet of the packetized communication if the located security tag is authentic.

5. The method according to claim 1, wherein the authenticating of the security tag in each packet of the packetized communication includes:
   quarantining each packet associated with an unauthenticated security tag; and
   sending each packet associated with the unauthenticated security tag for analysis.

6. The method according to claim 1, further comprising:
   passing, by the receiving node, each packet of the packet communication that is authenticated to the secured resource on the network.

7. The method according to claim 1, wherein the step of preventing access includes, if the security tag in the respective packet is not authenticated, preventing access by the respective packet having the security tag which is not authenticated to a secured resource.

8. The method according to claim 1, wherein the step of selecting the at least one placement location includes the steps of:

storing, in the receiving node, tag placement information based on network characteristics that affect selection of the placement location of the security tag in accordance with address ranges of nodes in the network; and
   sending, by the receiving node to the sending node, the tag placement information indicating the network characteristics that affect the selection of the placement location.

9. The method according to claim 1, wherein the step of selecting the at least one placement location includes the steps of:
   establishing, by the receiving node, the at least one placement location; and
   transmitting, by the receiving node, a placement message indicating the at least one placement location of the security tag in each of the packetized communication packet.

10. The method according to claim 1, wherein the step of selecting the at least
    one placement location further includes:
      receiving, by the receiving node from a sending node, a test packet having a plurality of security tags embedded in predetermined placement locations;
      choosing, by the receiving node, one or more locations corresponding to one or more of the predetermined placement locations in the test packet where the security tags are to be embedded in each packet of the packetized communication; and
      sending a placement message, from the receiving node to the sending node, that indicates the at least one placement location according to the chosen one or more predetermined placement locations.

11. A method for processing a security tag in each packet of a packetized communication, the packets being transmitted from a sending node in a network, the security tag including information relating to at least a user, the method comprising the steps of:
   sending, by the sending node to the receiving node, a first packet comprising a plurality of placement locations each with a tag;
   receiving, at the sending node, at least one tag placement directive from the receiving node, the at least one tag placement directive generated based on whether one or more tags at one or more of the plurality of placement locations has been removed or changed based on one or more network characteristics that can remove or change a security tag in a packet from the sending node to the receiving node;
   selecting, at the sending node, a first placement location among the plurality of placement locations to embed a first security tag in each packet of a first packetized communication being sent to a first receiving node, based on the received at least one tag placement directive, which indicates that the first placement location carries the first security tag unchanged over the network across one or more intermediaries to the first receiving node;
   inserting, by the sending node, the first security tag at the selected first placement location for each packet of the first packetized communication being sent to the first receiving node;
   transmitting, by the sending node, the first packetized communication with the first security tag;
   selecting, at the sending node, a second placement location among the plurality of placement locations to embed a second security tag in each packet of a second packetized communication being sent to a second receiving node, based on the received at least one tag placement directive, which indicates that the second placement location carries the second security tag unchanged over the network across one or more intermediaries to the second receiving node;

inserting, by the sending node, the second security tag at the selected second placement location for each packet of the second packetized communication being sent to the second receiving node; and transmitting, by the sending node, the second packetized communication with the second security tag.

12. The method according to claim 11, wherein:
the step of selecting the first placement location includes the step of receiving, by the sending node, a placement message indicating the first placement location among the plurality of placement locations to insert the first security tag; and the step of inserting the first security tag at the selected first placement location includes inserting the first security tag at the first placement location indicated in the placement message.

13. The method according to claim 11, wherein the step of selecting the first placement location to embed the first security tags includes:
establishing the first placement location as being in one or more of: (1) a transport payload portion of each packet; (2) a TCP option portion of each packet; or (3) an IP option portion of each packet.

14. A method for processing a security tag embedded in a plurality of packets of a packetized communication, the packets being transmitted from a sending node to a receiving node in a network, the security tag including security information regarding the packetized communication, the method comprising the steps of:
receiving, at the receiving node, a first packet from the sending node, the first packet comprising a plurality of placement locations each with a tag;

detecting, at the receiving node, if one or more tags at one or more of the plurality of placement locations has been removed or changed based on one or more network characteristics that can remove or change a security tag in a packet from the sending node to the receiving node;

sending, by the receiving node to the sending node, at least one tag placement directive generated based on the detection, the at least one tag placement directive indicating at a placement location among the plurality of locations to embed a security tag in each packet of a packetized communication, the placement location selected to carry the security tag unchanged over the network across one or more intermediaries to the receiving node;

authenticating, at the receiving node, each of the embedded security tags located at the selected placement location for the packets of the packetized communication; and passing packets that are authenticated to a secured resource on the network.

15. The method according to claim 14, further comprising the step of:
preventing, by the receiving node, access by each respective packet of the packet communication to a secured resource: (1) if the respective packet does not have the security tag embedded at the selected placement location; or (2) if the respective packet has the security tag embedded at the selected placement location and the security tag is not authenticated.

16. The method according to claim 15, further comprising:
embedding the security tag at the selected placement location for each packet of the packetized communication sent by the sending node in accordance with the placement location indicated in a placement message.

17. A sending node configured for transmitting packets toward a receiving node in a packetized communication network, comprising:
a transmission unit configured for sending, to the receiving node, a first packet comprising a plurality of placement locations each with a tag;

a receiver unit for receiving at least one tag placement directive from the receiving node, the at least one tag placement directive generated based on whether one or more tags at one or more of the plurality of placement locations has been removed or changed based on one or more network characteristics that can remove or change a security tag in a packet from the sending node to the receiving node;

a placement determination unit configured for selecting a first placement location among a plurality of placement locations for a first security tag to be embedded in each of a plurality of packets of a first packetized communication to be sent to a first receiving node, based on the received at least one tag placement directive, which indicates that the first placement location carries the first security tag unchanged over the network across one or more intermediaries to the first receiving node, and for selecting a second placement location among the plurality of placement locations for a second security tag to be embedded in each of a plurality of packets of a second packetized communication to be sent to a second receiving node, based on the received at least one tag placement directive, which indicates that the second placement location carries the second security tag unchanged over the network across one or more intermediaries to the second receiving node; and an insertion unit configured for inserting the first security tag at the first placement location for each of the packets of the first packetized communication, and inserting the second security tag at the second placement location for each of the packets of the second packetized communication;

the transmission unit further configured for transmitting first packetized communication with the inserted first security tag toward the first receiving node, and transmitting the second packetized communication with the inserted second security tag toward the second receiving node.

18. The sending node according to claim 17, wherein the sending node is configured to receive network characteristics information associated with an address of the sending node to select the first placement location.

19. A receiving node configured for receiving packets sent by a sending node in a packetized communication network, comprising:
a receiving unit configured for receiving a first packet from the sending node, the first packet comprising a plurality of placement locations each with a tag, and detecting if one or more tags at one or more of the plurality of placement locations has been removed or changed based on one or more network characteristics that can remove or change a security tag in a packet from the sending node to the receiving node;

a sending unit configured for sending, to the sending node, at least one tag placement directive generated based on the detection, the at least at least one tag placement directive indicating at least one placement location among the plurality of locations to embed a security tag in each packet of a packetized communication, the at least one placement location selected to carry the security tag unchanged over the network across one or more intermediaries to the receiving node, wherein the receiving unit is further configured to receive packets from the sending node embedded with a security tag; and a packet processor configured for authenticating, at the receiving node, the security tag embedded in each of the packets, wherein the packet processor prevents access by a respective packet of the packetized communication to a secured resource: (1) if the respective, received packet does not have the security tag embedded in a selected one of a plurality of placement locations, or (2) if the security tag embedded at the selected one of the plurality of placement locations is not authenticated, the one of the plurality of placement locations selected responsive to at least one tag placement directive from the receiving node generated based on one or more predetermined network characteristics that can remove or change a security tag in a packet, the location selected to carry the security tag unchanged over the network across one or more intermediaries to the receiving node.

20. The receiving node according to claim 19, further comprising:

a network characteristics table configured for storing information indicating network characteristics that affect selection of the placement locations for different ranges of addresses of nodes on the packetized communication network; and a transmitting unit configured for sending, to the sending node, the network characteristics table.

21. A non-transitory computer readable storage medium configured for storing computer code to execute a method for processing a security tag in each packet of a packetized communication, the packets being transmitted to a receiving node in a network, the security tag including information relating to at least a user, the method comprising the steps of:

sending, by a sending node to the receiving node, a first packet comprising a plurality of placement locations each with a tag;

receiving, at the sending node, at least one tag placement directive from the receiving node, the at least one tag placement directive generated based on whether one or more tags at one or more of the plurality of placement locations has been removed or changed based on one or more network characteristics that can remove or change a security tag in a packet from the sending node to the receiving node;

selecting, at the sending node, at least one placement location among the plurality of placement locations to embed a security tag in each packet of a packetized communication, responsive to the at least one placement directive from the receiving node, the at least one placement location selected to carry the security tag unchanged over the network across one or more intermediaries to the receiving node;

receiving, at the receiving node, each packet of the packetized communication, each packet having the embedded security tag;

authenticating, at the receiving node, the embedded security tag in each packet; and if a respective packet of the packetized communication is received by the receiving node without the security tag embedded in the selected placement location, preventing access by the respective packet which does not have the security tag embedded in the selected placement location to a secured resource.

* * * * *